July 3, 1962  E. A. PETERSON ETAL  3,041,736
METHOD AND APPARATUS FOR DRYING REGENERATED
CELLULOSE TUBING
Filed March 28, 1958  2 Sheets-Sheet 1

INVENTORS
EARL A. PETERSON
ELIO E. TARIKA
NORMAN T. ROSSEN
BY Richard S. Shreve
ATTORNEY

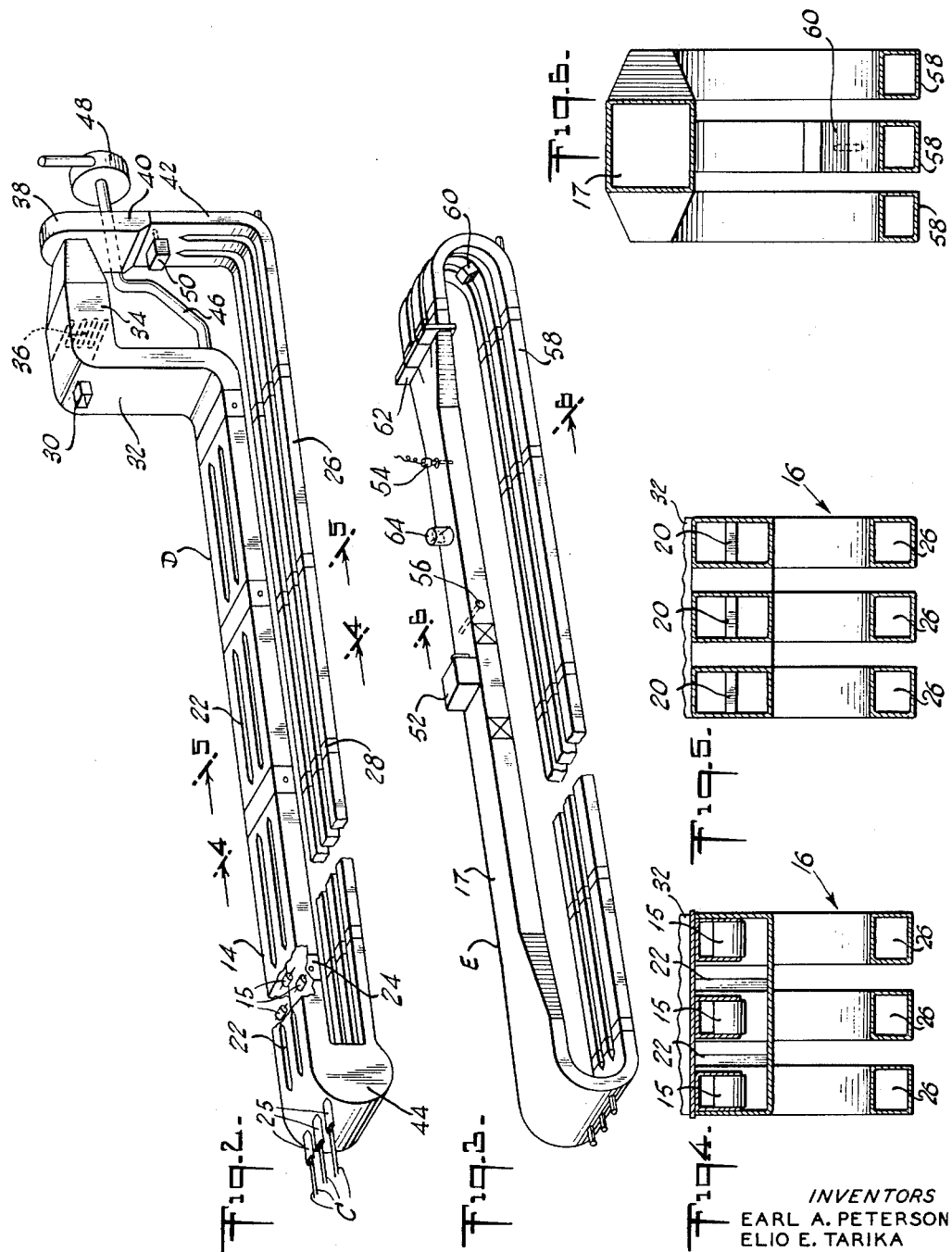

United States Patent Office 3,041,736
Patented July 3, 1962

3,041,736
METHOD AND APPARATUS FOR DRYING REGENERATED CELLULOSE TUBING
Earl A. Peterson, Downers Grove, Elio E. Tarika, Chicago Heights, and Norman T. Rossen, Oaklawn, Ill., assignors to Union Carbide Corporation, a corporation of New York
Filed Mar. 28, 1958, Ser. No. 724,723
7 Claims. (Cl. 34—12)

This invention relates to method and apparatus for drying, and more particularly for drying gel regenerated cellulose tubing in an inflated state.

One procedure for producing cellulose sausage casings, or tubing is by the viscose method. According to such method, the viscose is extruded through an annular orifice into a regenerating bath to produce cellulose tubing. The tubing is then washed in water and treated with a softening agent, after which it is dried.

In a continuous operation the tubing is dried while it is being advanced continuously through a housing through which heated air is circulated to dry the tubing. Posterior and anterior of the housing are rolls which cooperate to advance the tubing and also compress it to confine a quantity of air in the tubing intermediate the rolls. The quantity of air confined within the tubing is such as to maintain the tubing at the proper diameter during the drying operation.

The tubing product is wound on reels in a flattened collapsed form which is subsequently cut in desired lengths appropriate for use in the production of skinless franks and sausage, as well as for wrapping and encasing of preprocessed meat items. For production of skinless frankfurters, an appropriate length of tubing is shirred and the shirred casings humidified, in which condition they are supplied to the frankfurter producer. One of the additional features of this invention eliminates the necessity for humidifying the casing after the shirring operation and results in operating economies thereby. For larger size sausage and preprocessed items appropriate lengths are supplied to the packer in a flattened state. It is apparent that the method of the invention may be practiced under different conditions with respect to seamless cellulose tubing with or without reinforcing fiber mat.

Prior to our invention the method of drying was based on removing moisture from the casing by exposing the casing to a high velocity stream of hot air. Under these conditions cellulose casings obeyed standard drying conditions. Therefore, all other variables remaining constant, the final casing moisture was a function of inlet casing moisture and contact time in the dryer. Since in a continuous production operation the contact time was fixed, fluctuations in inlet moisture resulted in fluctuations of final moisture content.

The method of this invention is based on the following phenomena which have been experimentally established:

(1) There is an equilibrium condition between moisture content of the casing and moisture content of the surrounding air.

(2) A final casing moisture very close to the equilibrium value can be obtained in a reasonable time by exposing casing that has been dried to a lower moisture content to the equilibrium atmosphere.

(3) Experimental observation indicates that the casing absorbs moisture at a much faster rate than moisture is removed by drying. Therefore, the equilibrium condition can be attained in an equalizer housing of practical length and equilibrium moisture in the film can be attained therein by drying to lower than the final moisture in a dryer housing, and allowing the tubing to absorb moisture in an equalizer housing.

In practice the tubing is dried in a continuous hot air dryer to a moisture range below the desired final moisture content. It is then continuously passed to an equalizer in which it is exposed to air having the desired equilibrium moisture content. The result is a product having uniform final moisture regardless of normal variations in inlet moisture.

The new dryer is a two-stage steam heated air dryer and incorporates a basic change in the way the casing is dried. In the first stage the casing is dried in the normal manner to a moisture below the required final moisture content. Then in the second stage the casing is equilibrated at high humidity to the desired final moisture content. Tests have established that by drying casing in this manner much improved uniformity of moisture content can be achieved and casing can be dried successfully to a final moisture content as high as 20%, the percentage being based on the weight of the water content divided by the combined weight of water and tubing and plasticizer. Using the old method, it was not possible to dry the casing to moisture content higher than 9%, such as 12% to 16%, without adversely affecting the required uniformity of moisture in the casing.

According to the present invention there is provided a continuous method wherein gel regenerated cellulose tubing in an inflated state is subjected to a drying medium until the moisture content thereof is lower than that desired in the final product and subjecting the thus dried tubing while still in the inflated state to an atmosphere of appropriate relative humidity until the moisture content of the tubing is equilibrated to such atmosphere; the equilibrating atmosphere being of a relative humidity corresponding to at least the desired final moisture content of the product and which is greater than that of the tubing originally subjected to the equilibrating atmosphere.

The old method of drying removed moisture from the film by exposing all strands (of equal length) in a plurality, for example three dryer sections to a single controlled source of hot air in each section. Thus final casing moisture was a function of retention time and input casing moisture. Different sizes and thicknesses of casing, operated in such a unit, were dried to different final moisture content. Undesirable variation in moisture content of a single strand was common to the old method. This required supplementary conditioning in a finishing operation.

The new method permits adjusting the retention time of each strand. By drying below the desired end-point condition and equalizing through a zone of higher humidity, fluctuations in moisture content for all strands, above and below the optimum, are leveled out. The new method provides an improvement in moisture control in a single strand of casing, leveling out periodic fluctuations which result from a number of operating variables.

The old method of drying employed three dryer sections—portions of which were comprised of a plurality of separate sheet metal air ducts, each accommodating two strands of casing. Different sizes and thicknesses of casings could not be dried in the same duct by the old method, because they were subjected to equal retention time and thus might be dried to different final moisture content.

The new method permits operating more than one size and thickness of casing in each duct by drying all strands in the duct below the desired end-point and equalizing the moisture content of all strands of casing in a zone of higher humidity, thereby leveling out the differences in moisture content of the casings discharged from the drying section.

The old method controlled the drying of all strand positions by a plurality of dry-bulb temperature controllers in a like number of separate zones.

The new method is operated with a similar control in the drying section. The equalizing section is operated with a "dew-point" controller governing total moisture introduced, and separate dry-bulb controllers for each two-strand duct governing steam heating coils. Such heating coils temper the air in each duct to provide the desired equilibrium conditions.

The old method was arranged to carry each strand horizontally in one direction throughout the drying zones.

The new method is arranged to permit reversals of strand travel which saves floor space for equivalent retention time.

Although the invention is intended for use in the simultaneous treatment of one of a plurality of tubings of the same size and thickness, it permits adjusting the time each tubing of a plurality of tubings passes through the dryer, so that different sizes and thicknesses of tubings may be simultaneously dried in one machine, and fluctuations in moisture content for each individual tubing are leveled out. Also, the dryer is constructed to permit reversals of tubing travel in the dryer which results in a saving of floor space for equivalent drying. The equalizing section is operated with a "dew-point" controller governing the introduction of such quantity of moisture into the drying medium as may be required to permit the tubings to obtain the desired final moisture content, and separate dry-bulb controllers for each two-tubing duct governing steam heating coils which may temper the air in each duct to provide the desired equilibrium conditions.

In the drawings:

FIG. 2 is a perspective view of the dryer stage indicated in FIG. 1;

FIG. 3 is a perspective view of the equalizing stage shown in FIG. 1;

FIG. 4 is a vertical section taken along the line 4—4 of FIG. 2;

FIG. 5 is a vertical section taken along the line 5—5 of FIG. 2; and

FIG. 6 is a vertical section taken along the line 6—6 of FIG. 2.

Figure 1:
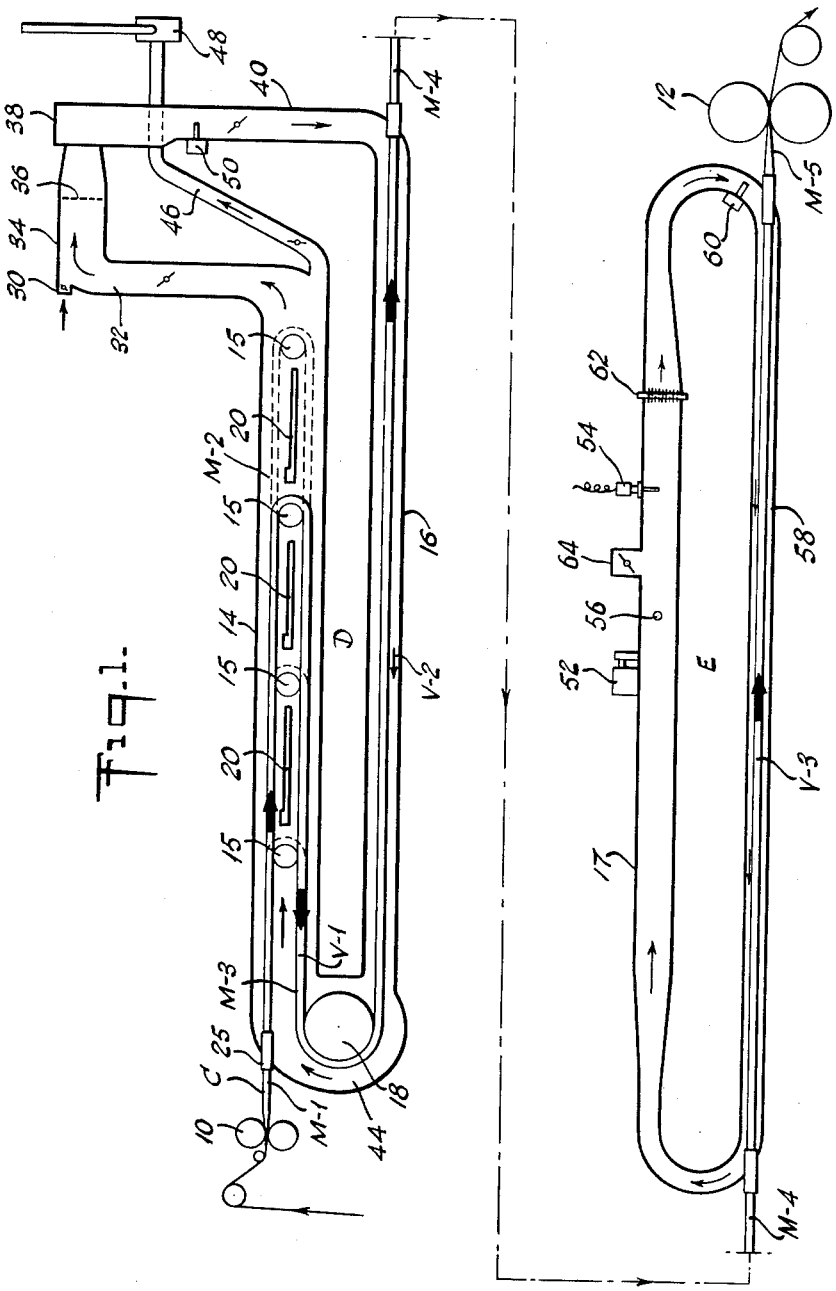
FIG. 1 is a digrammatic flow sheet displaced as indicated by dot and dash lines showing the path of the film drying medium and equilibrating medium in the process.

The preferred embodiment of the invention hereinafter described is particularly suitable for drying cellulosic film, preferably in tubular form, and embracing small casings having a diameter not over one and one-half inches used for skinless frankfurters, and large casings of plain and reinforced cellulose from one and a half to ten inches in diameter or more for processed sausage and trimmed meat items.

As shown in FIG. 1, the drying apparatus comprises a dryer D and an equalizer E. The casing C is inflated as it is discharged from the extrusion machine and travels generally from left to right through the dryer D and the equalizer E, with the bubble of air trapped between the wet end nip rolls 10 ahead of the dryer D and the dry end nip rolls 12 beyond the equalizer E.

The dryer D comprises a continuous circuit including an upper duct 14 and divided plurality of compartments comprising a lower duct 16 for the circulation of drying air. The equalizer E comprises a continuous circuit including an upper duct 17 and a divided plurality of parallel lower ducts 58 for the circulation of equilibrium atmosphere.

At the wet end nip rolls 10 the inflated casing C is introduced into the top portion of the upper duct 14 of the primary drying section D. The casing C is exposed to high velocity heated air and the casing is thereby dried to a lower moisture content.

The upper duct 14 is provided with four six-inch diameter reversing rollers 15 spaced at intervals along its length. Appropriate choice of one of these rolls in stringing up a strand of casing based on diameter and thickness of tubing permits a variation in retention time from tubing strand to tubing strand in this section. It is desirable that the casing be curved around the reversing roll in a condition wetter than moisture content of 45%.

In passing through the reverse section at the lower portion of the upper duct 14, the casing C is dried to a lower moisture content and is again reversed in direction, passing around a twenty-eight inch diameter roll or pulley 18 and into the lower duct section 16. Casing C may not be curved around the roll 18 in a condition substantially drier than 30% moisture without adversely wrinkling or differentially stretching or both of the casing, affecting subsequent performance.

In the lower section 16 the casing C is exposed to higher velocity air heated to higher temperature and dried to a lower moisture content. The moisture content of the tubings C at the end-point of primary drying is approximately at least 2% less than the desired terminal point of the entire operation.

After drying below the desired terminal condition, the casing is passed into the equalizing section E of the machine, where it is exposed to high velocity air which is closely regulated in temperature and moisture content. Live steam is fed into the equalizing air upon demand as sensed by a "dew-point" controller. Dry-bulb temperature of the circulating air for each two strands of casing is controlled by separate steam coils, one per duct.

Referring to FIG. 2, the inflated casing strands C are introduced into the upper portion of the upper air duct 14 of the drying section D through sleeves 25. Referring again to FIG. 1 the portions of this duct 14 between respective pairs of adjacent reversing rollers 15 are discontinuously divided in two by respective horizontal sheet metal divider frames 20, and by vertical streamlined hollow wall sections 22 shown on FIG. 2.

The portions of the duct 14 containing the reversing rollers 15 are undivided and provided with vertically hinged access doors 24 to facilitate threading the casing strands forwardly through the upper duct compartments or relatively reversing the direction of casing strands to the lower duct compartments by passing circumferentially downward around the rolls 15.

A series of such horizontally disposed reversing rolls 15 are provided in each two-strand duct and are alternately displaced along the axis of the dryer in adjacent compartments to facilitate lacing strands in the innermost compartments. The preferred embodiment of the upper duct 14 is fabricated of insulated sheet metal and is comprised of three upper and three lower compartments.

The lower duct 16 of the drying section D is made up of a plurality of separate insulated sheet metal air ducts 26, each accommodating two strands of casing therein. A horizontally hinged access door 28 is provided on the top-side of each duct 26 in a plurality of positions along the duct to facilitate threading the casing strands therethrough.

The dryer D is provided with a dampered air intake 30 at the top of a vertical undivided air return duct section 32 leading up from the upper duct section 14 and joining an undivided horizontal duct section 34. In the section 34 are mounted steam heated coils 36 and a circulating blower 38. The air from the inlet 30 and return section 32 is heated by the coils 36 and circulated by the blower 38 through a vertical undivided downwardly extending duct section 40 and lower divided dampered duct section 42 into the ducts 26.

In the drying section, humidity control of the drying air is accomplished by bleeding off an appropriate quantity of moisture-laden air through a dampered duct 46 and a variable speed exhaust blower 48. Dampering the duct 46 controls the quantity of exhaust air, dampering the inlet 30 controls the quantity of intake ambient air, and dampering the duct 32 provides a balancing control for the circulating air. A dry-bulb controller 50 modulates steam supply to heating coils 36 at the suction side of the blower 38.

The heated air flows through the ducts 26 in counterflow direction to the casing travel and is recombined in a return bend plenum 44. The air flow is then reversed 180° in direction around outside of the overdriven return pulleys 18. There are preferably three such pulleys of 9½ inch face width each to accommodate two casing strands.

In the equalizing section E, air is circulated by a variable pitch bladed circulating blower 52. A "dew-point" controller diagrammatically shown at 54 modulates a supply of live steam introduced at 56 the discharge side of the blower 52. The discharge portion of the equalizer E is divided into a plurality of lower horizontal ducts 58, one for each two strands of casing being moisture-equalized. A dry-bulb controller 60 in each two-strand duct modulates steam heating coils 62 to temper the humidity conditioned air in each such duct. An excess of moisture-laden air may be selectively bled off through dampered exhaust duct 64.

The range of and preferred conditions at selected points designated in FIG. 1 are:

| Point Designation | Range | | | Preferred | | |
|---|---|---|---|---|---|---|
| | Casing Moisture (by weight), percent | Air Velocity (f.p.m.) | D.B. Air Temp. (° F.) | Casing Moisture (by weight), percent | Air Velocity (f.p.m.) | D.B. Air Temp. (° F.) |
| M-1 | 55-65 | | | 60 | | |
| V-1 | | 1,000-2,500 | 140-185 | | 2,000 | 165 |
| M-2 | 40-50 | | | 45 | | |
| M-3 | 30-40 | | | 30 | | |
| V-2 | | 2,000-5,000 | 150-200 | | 4,000 | 185 |
| M-4 | 7-15 | | | 8 | | |
| V-3 | | 750-3,000 | 140-160 | | 2,000 | 145 |
| M-5 | 8-20 | | | 16 | | |

Since it is obvious that various changes and modifications may be made in the above description without departing from the nature or spirit thereof, this invention is not restricted thereto except as set forth in the appended claims.

What is claimed is:

1. A continuous two-stage method of drying and rehumidifying gel regenerated cellulose tubing which comprises continuously passing said tubing having a moisture content of from 55% to 65% into a first stage dryer, continuously inflating said tubing as it passes into said first stage dryer, continuously maintaining said tubing inflated as it passes through said first stage dryer, continuously subjecting said inflated tubing in said first stage dryer to a drying medium comprising a stream of drying air at a velocity of from 1000 to 2500 feet per minute heated to a temperature of from 140° to 185° until the moisture content thereof is from 7% to 15% which is lower than that desired in the final product, continuously withdrawing the thus dried inflated tubing from said first stage dryer, continuously passing the thus withdrawn inflated tubing into a second stage equalizer wherein it is subjected to an atmosphere of appropriate relative humidity at a velocity of from 750 to 3000 feet per minute and at a temperature of from 140° F. to 160° F. until the moisture content of the tubing is equilibrated to such atmosphere; the equilibrating atmosphere being of a relative humidity corresponding to the desired final moisture content of the product of from 8% to 20% and which is greater than that of the tubing originally subjected to the equilibrating atmosphere.

2. Method as claimed in claim 1, in which the film is subjected to a stream of drying medium first in parallel flow, then in counterflow and again in parallel flow.

3. Apparatus for drying cellulose tubing which comprises means for subjecting gel regenerated cellulose tubing in an inflated state to a drying medium in a drying zone first in parallel flow, then in counterflow and again in parallel flow until the moisture content thereof is lower than that desired in the final product, means for subjecting the thus dried tubing while still in the inflated state to an atmosphere of approximate relative humidity until the moisture content of the tubing is equilibrated to such atmosphere; and means for maintaining the equilibrating atmosphere of a relative humidity corresponding to the desired final moisture content of the product and which is greater than that of the tubing originally subjected to the equilibrating atmosphere, in which said first stage dryer comprises a housing having upper and lower ducts, and a return bend, and reversing rollers for passing the casing into the top of said upper duct back along the bottom of said upper duct and through said return bend to said lower duct.

4. Apparatus for drying cellulose tubing which comprises means for subjecting gel regenerated cellulose tubing in an inflated state to a drying medium in a drying zone first in parallel flow, then in counterflow and again in parallel flow until the moisture content thereof is lower than that desired in the final product, means for subjecting the thus dried tubing while still in the inflated state to an atmosphere of approximate relative humidity until the moisture content of the tubing is equilibrated to such atmosphere; and means for maintaining the equilibrating atmosphere of a relative humidity corresponding to the desired final moisture content of the product and which is greater than that of the tubing originally subjected to the equilibrating atmosphere, in combination with rollers for supporting the strand length being subjected to drying medium in the first stage dryer, and means for varying the span between said supporting rollers.

5. Apparatus for drying cellulose tubing which comprises means for subjecting gel regenerated cellulose tubing in an inflated state to a drying medium in a drying zone first in parallel flow, then in counterflow and again in parallel flow until the moisture content thereof is lower than that desired in the final product, means for subjecting the thus dried tubing while still in the inflated state to an atmosphere of approximate relative humidity until the moisture content of the tubing is equilibrated to such atmosphere; and means for maintaining the equilibrating atmosphere of a relative humidity corresponding to the desired final moisture content of the product and which is greater than that of the tubing originally subjected to the equilibrating atmosphere, in which said first stage dryer comprises a housing, and means for supporting a plurality of tubings passing simultaneously through said housing, in combination with means for varying the span between said supports of the respective tubings passing through said housing.

6. Method as claimed in claim 1, in which a plurality of tubings of differing diameters or thicknesses is subjected as a group, initially to a drying medium, then to an equilibrating atmosphere, the equilibrating atmosphere being of a relative humidity corresponding to the desired final moisture content of the product tubings and which is greater than that of any tubing of the group of tubings subjected to the equilibrating atmosphere.

7. Apparatus as claimed in claim 4, in combination with a roll in said conduit, the opposite end of said lower duct having a tubing exit, said reversing rollers being locatable at several stationary positions in said upper duct, in such a way as to allow the tubing entering the upper duct to be reversed 180° back along the lower part of said upper duct and around said roll and through said tubing exit.

References Cited in the file of this patent

UNITED STATES PATENTS

| | | |
|---|---|---|
| 1,551,913 | Smith | Sept. 1, 1925 |
| 1,556,057 | Wheller | Oct. 6, 1925 |
| 1,759,495 | Voss | May 20, 1930 |
| 1,890,026 | Barkelew | Dec. 6, 1932 |
| 1,967,773 | Hewitt | July 24, 1934 |
| 2,344,686 | Faneslow | Mar. 21, 1944 |
| 2,492,440 | Reichel | Dec. 27, 1949 |
| 2,501,537 | Parkes | Mar. 21, 1950 |

FOREIGN PATENTS

| | | |
|---|---|---|
| 24,931 | Great Britain | 1903 |
| 544,586 | Great Britain | Apr. 20, 1942 |
| 871,063 | France | Jan. 3, 1942 |

OTHER REFERENCES

"Drying and Processing," published by Carrier Engineering Corporation, copyright 1929.